United States Patent [19]

Kato et al.

[11] Patent Number: 4,618,156
[45] Date of Patent: Oct. 21, 1986

[54] VEHICLE HEIGHT CONTROL SYSTEM

[75] Inventors: Hideaki Kato, Nagoya; Kaoru Oohashi, Okazaki, both of Japan

[73] Assignees: Nippondenso Co., Ltd., Kariya; Toyota Jidosha Kabushiki Kaisha, Toyota, both of Japan

[21] Appl. No.: 665,067

[22] Filed: Oct. 26, 1984

[30] Foreign Application Priority Data

Oct. 27, 1983 [JP] Japan .................. 58-202433

[51] Int. Cl.$^4$ ........................................... B60G 11/26
[52] U.S. Cl. .................... 280/6 R; 280/6 H; 280/707
[58] Field of Search .............. 180/41; 280/6 R, 6 H, 280/6.1, 6.11, 707; 340/686

[56] References Cited

U.S. PATENT DOCUMENTS

| | | | |
|---|---|---|---|
| 3,768,820 | 10/1973 | Yew | 280/6 R |
| 3,917,307 | 11/1975 | Shoebridge | 280/6 H |
| 3,976,302 | 8/1976 | Hammarstrand | 280/6 H |
| 4,018,296 | 4/1977 | Knudson | 280/6 H |
| 4,315,631 | 2/1982 | Rainville | 280/6 H |
| 4,502,006 | 2/1985 | Goodwin et al. | 324/208 |

FOREIGN PATENT DOCUMENTS

| | | |
|---|---|---|
| 0039181 | 4/1981 | European Pat. Off. . |
| 1234137 | 2/1967 | Fed. Rep. of Germany . |
| 56-162010 | 12/1981 | Japan . |

Primary Examiner—Richard A. Bertsch
Attorney, Agent, or Firm—Cushman, Darby & Cushman

[57] ABSTRACT

An improved vehicle height control system comprises vehicle height adjusters responsive to a control signal for adjusting a longitudinal inclination of the vehicle body, an inclination signal generator for generating an inclination signal indicative of an inclination of a road surface on which the vehicle is running, and a control unit for supplying to the vehicle height adjusters the control signal for increasing the height of the rear part of the vehicle body relative to that of the front part thereof when the road surface is ascendant.

11 Claims, 3 Drawing Figures

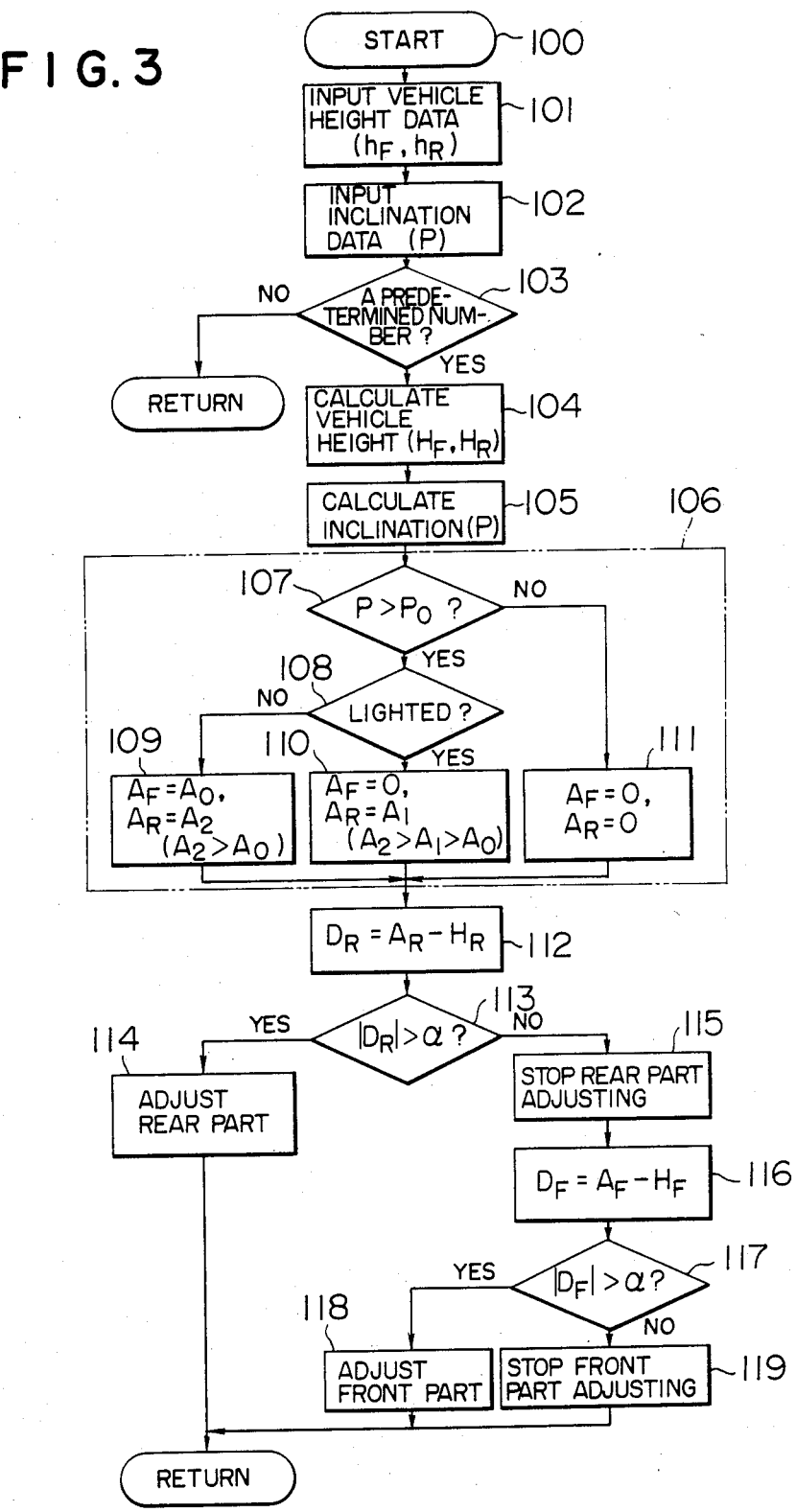

VEHICLE HEIGHT CONTROL SYSTEM

The present invention relates to a vehicle body height control system, or more in particular to a system for controlling the body height of a vehicle running up an ascendant slope. The system of this invention is hereinafter referred to simply as the vehicle height control system.

A vehicle height control system has been proposed heretofore, in which, in order to obtain a desired vehicle height in response to the number of passengers, the amount of loads, the travelling conditions and the road surface conditions, a plurality of vehicle height adjusters are employed to control the vehicle height at a target position.

Such a vehicle height control system gives rise to a problem that, when the vehicle is running up a steep slope with the vehicle body maintained in parallel with the road surface, the driver and passengers are forced to assume a posture as if they are pulled back, which causes the driver's visibility range to be narrowed. The present invention has been made with the aim of solving the above-mentioned problem.

The primary object of the present invention is to provide an improved vehicle height control system which is able to improve a riding feeling or performance by improving the visibility range of the driver.

The present invention provides a vehicle height control system for increasing the height of the rear part of the vehicle body in response to the degree of inclination of the road surface, or for increasing the height of the rear part of the vehicle body by a set amount when the road surface inclination is more than a predetermined amount. Thus, a vehicle height control system according to the present invention includes a vehicle height adjust means which is responsive to a control signal and which adjusts respective heights of a front end and a rear end of the vehicle. A position signal generator means generates actual positions which are indicative of the heights of the front and rear ends of the vehicle. A inclination detect means generates an inclination signal which is related to an inclination of the road surface on which the vehicle is running. Also, lighting detect means detects whether the head lamps of the vehicle are lit. A command means controls the system and generates a first command signal which allows the vehicle height adjust means to raise the height of the rear end of the vehicle by a predetermined amount when the inclination signal indicates that the inclination of the running surface upon which the vehicle is running is ascending. A second command signal generated by the command means allows the vehicle height adjust means to raise the rear end by a predetermined amount which is smaller than the first predetermined amount when the vehicle is running on an ascending surface and the head lamps of the vehicles are lit. The height difference between the front end and the rear end is controlled by control means which compares the first and second command signals with actual position signals and allows the adjust means to adjust the height difference therebetween.

Alternatively, the command means may generate a command signal including a front target signal representing the target value of the height of the front of the vehicle and a rear target signal indicating a target value of the height of the rear part of the vehicle, when an inclination of the running surface in an ascending direction is detected.

The inclination signal generator means may be directly responsive to the inclination of the vehicle body or responsive to the operating condition of the engine. (In the case of an internal combustion engine, it may be deemed that the vehicle is running up a slope when an opening degree of the throttle valve of the engine is great and the engine speed is low.)

The present invention will be apparent from the following detailed description taken in conjunction with the accompanying drawings, in which:

FIG. 3 is a flowchart showing a control program for the operating circuit comprised in the electric control unit shown in FIG. 2.

Figure 1:
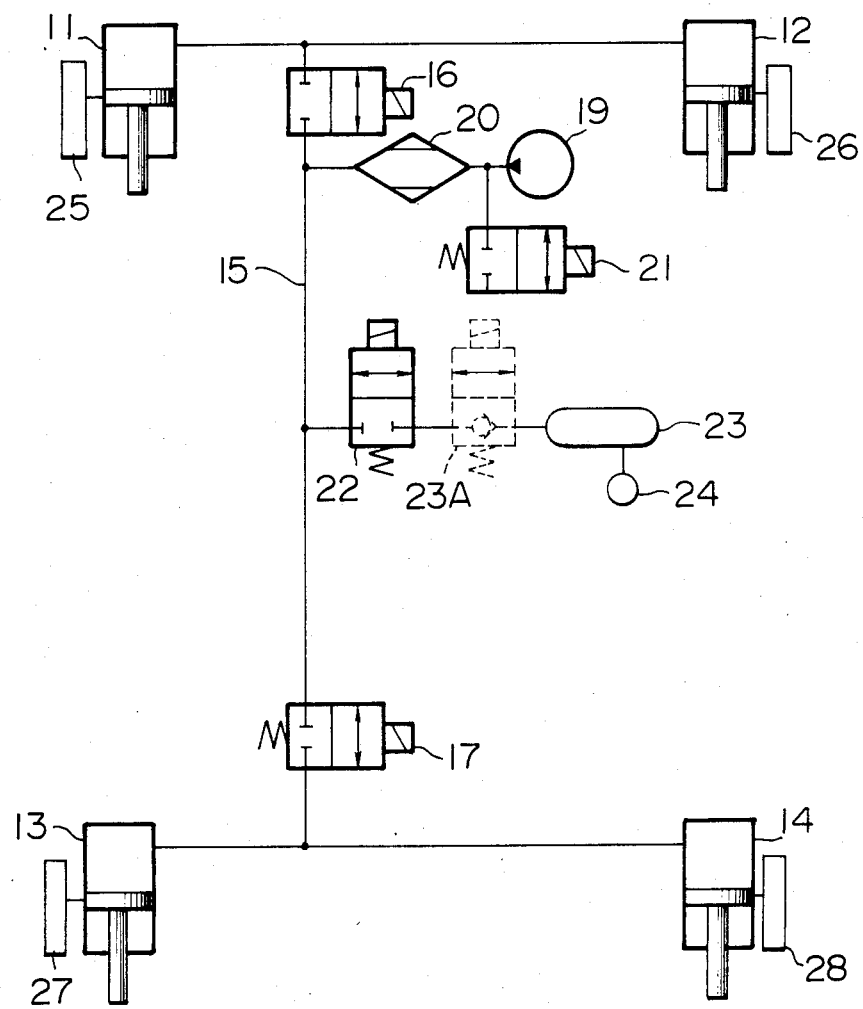
FIG. 1 is a schematic diagram showing an arrangement of the vehicle height adjusting means of an embodiment of the present invention.

The arrangement of the adjusting means according to the present invention incorporated in an air suspension system is shown in FIG. 1. In FIG. 1, reference numerals 11 to 14 designate shock absorbers mounted on the wheels of a four-wheeled vehicle, or, in particular, vehicle height adjusting sections thereof. The respective shock absorbers 11, 12 for the front wheels, are combined with a normally closed solenoid valve 16 which is adapted to communicate with an air passage 15 upon energization thereof, to form vehicle height adjusting means capable of adjusting the distance between the wheels and the vehicle body, that is, the vehicle body height. The respective shock absorbers 13, 14 for rear wheels are similarly combined with a solenoid valve 17 to form an other vehicle height adjusting means.

In an air intake and exhaust system connected with the air passage 15, an electrically operated air pump 19 supplies compressed air to the air passage 15 through an air dryer 20. A normally-closed solenoid valve 21 which is adapted to release the air passage 15 to atmosphere upon energization thereof is inserted between the air pump 19 and the dryer 20. The air dryer 20 including a moisture-absorbing member removes moisture contained in air supplied to the air passage 15 from the pump 19 and also dries the moisture absorbing member when air is released into atmosphere from the air passage 15 through the solenoid valve 21.

The air passage 15 is connected also with an air tank 23 through a normally-closed solenoid valve 22. The air tank 23 is provided with a pressure detection switch 24 which generates a signal when the air pressure in the air tank 23 is reduced below a predetermined level.

The vehicle height adjusting means operate in such a manner that, upon 1 energization of the solenoid valves 16 and 17 which connects the shock absorbers 11, 12 and 13, 14 to the air passage 15, to energization of the tank solenoid valve 22, and 3 de-energization (cut-off) of the exhaust solenoid valve 21, air is supplied into a vehicle height adjusting cylinder of each of the shock absorbers 11 to 14 thereby to increase the vehicle height against the vehicle body load. Upon 1 energization of the solenoid valves 16, 17 with connects the shock absorbers 11, 12 and 13, 14 with the air passage 15, and 2 energization of the exhaust solenoid valve 21, on the other hand, the air is released from the cylinders thereby to lower the vehicle height. At the time of releasing air, the tank solenoid valve 22 is de-energized to prevent the pressure in the tank from dropping.

The air pressure in the air tank 23 is maintained at a predetermined level or higher while the control system is in operation. Specifically, a driver circuit is provided (not shown) which is actuated upon closing of a main switch (not shown) in response to the operation of a key switch which activates the electrically operated air pump in response to a signal indicating an air pressure decrease produced by the pressure detection switch 24.

In order to prevent abrupt air exhaust, an appropriate orifice is provided in the path of the exhaust solenoid valve 21. Further, a solenoid valve 23A which functions as a check valve in a de-energized state thereof to maintain the pressure in the air tank 23 during a release period may be mounted in the passage of the air tank 23.

The shock absorbers 11 to 14 are provided with vehicle height sensors 25 to 28 respectively for generating an actual position signal indicating the vehicle height corresponding to the results of the adjustment of the vehicle height adjusting means. These vehicle height sensors, which produce a signal changing stepwise or continuously in response to a change in the vehicle height, are of a well-known photo-electric or inductance type.

Figure 2:
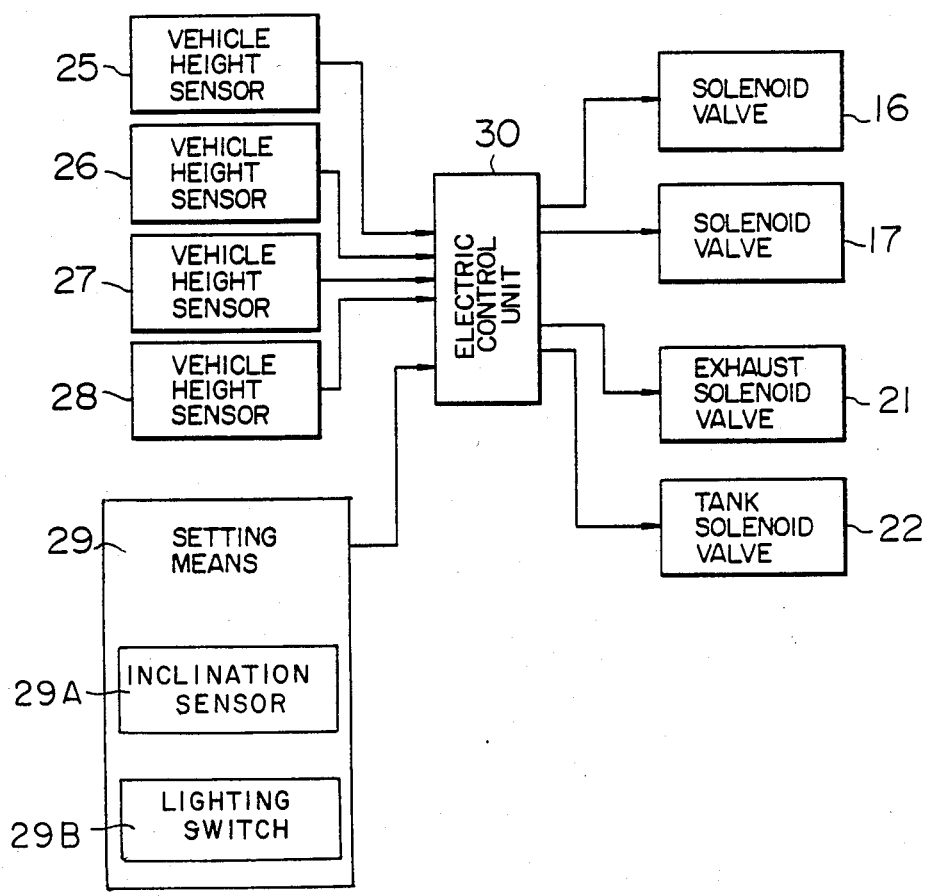
FIG. 2 is an electric circuit diagram of the system of this invention shown in FIG. 1.

A construrction of the electrical circuit of this system is shown in FIG. 2. A driver circuit for the air pump 19 described above is not shown, and is well known to those of ordinary skill in the art.

In FIG. 2, setting means designated by numeral 29 produces a change signal for changing the target position in order to control the vehicle body height. This change signal, as in the prior art, is produced in association with at least one of the factors including the number of passengers, the amount of loads, the travelling conditions such as a travelling speed, the road conditions such as a road surface inclination, the operating conditions of a manual switch, etc.

In the embodiment of this invention, the setting means 29 includes an inclination sensor 29A for generating an electric signal corresponding to an inclination of the vehicle body and a lighting switch 29B operatively interlocked with the lighting of the front light.

Signals produced from the vehicle height sensors 25 to 28 and the setting means 29 are applied to an electric control unit 30. The electric control unit 30 includes an operating circuit (microcomputer) for executing an operating process specified by a preset computer program, and an input/output interface for transmitting an output signal corresponding to the operation result of the operating circuit to an external circuit.

FIG. 3 shows essential parts of the vehicle height control program related to the present invention which is executed by the operating circuit of the electric control unit 30. The shown program is started at an interruption starting step 100 at regular intervals of several msec thereby to control the repeated vehicle height adjusting process.

The operation of this system will be explained with reference to the vehicle height control program. Firstly, at the program step 101 shown in FIG. 3, the electric control unit 30 receives actual position signals from the vehicle height sensors 25 to 28 at its operating circuit and stores them as data h indicative of the actual instantaneous vehicle heights. These data h are used to determine an average value of the vehicle height for the two front wheels and an average value of vehicle height for the two rear wheels so that vehicle height data $h_F$ and $h_R$ of the front and rear parts, respectively, are obtained.

The next step 102 stores inclination data P based on an inclination signal supplied from the inclination sensor 29A. The vehicle height data and the inclination data are repeatedly supplied until the sampling number thereof reaches a predetermined number.

Upon receipt of the predetermined number of data, the step 104 calculates an average value of the vehicle height data to determine the front vehicle height $H_F$ and the rear vehicle height $H_R$. Then the step 105 calculates an average valve of the inclination data to determine an inclination degree P.

Next, step 106 calculates a target adjustment position. In this embodiment, the inclination degree P and on or off of the front light are indicated as a representative example for changing the target adjustment position. Step 106 checks to decide whether the inclination degree P has exceeded a reference value $P_0$ set in advance. The reference value $P_0$ is used to determine whether the running road surface is a slope exceeding a predetermined inclination degree. If the inclination degree P exceeds the reference value $P_0$, step 108 decides whether the front light is lighted or not by a signal from the switch 29B.

In the case where the inclination degree P is high and the front light is not lighted (such as in daytime), the target front adjustment position $A_F$ of the front adjusting means is set to a predetermined reference value $A_0$ and the target rear adjustment position $A_R$ of the rear adjustment means to a value $A_2$ higher than the reference valve $A_0$. This is indicative of the fact that the vehicle body is intended to be inclined forwardly with the front part thereof maintained to be higher than the rear part thereof.

If the inclination degree P is large but when the front light is lighted (such as during night), the target rear adjustment position $A_R$ is maintained at a relatively low position of $A_1$ ($A_2 > A_1 > A_0$) in consideration of a change in the optical axis of the front light.

When the inclination degree P is small, on the other hand, both the front and rear adjustment means are set to a target adjustment position equal to the reference valve $A_0$ regardless of the fact that the front light is lighted or not.

The program steps from 112 to 115 control the adjusting procedure of the rear adjusting means. Firstly, step 112 calculates a target difference $D_R$, that is, a difference or deviation between the target adjusting position $A_R$ and the actual vehicle height $H_R$ of the rear vehicle part, and step 113 checks to decide whether the target difference meets the tolerance $\alpha$ set in advance.

If the target difference exceeds the tolerance, step 114 is executed. Step 114 energizes and opens the rear solenoid valve 17, and, if the target difference D is positive, further generates an output signal to de-energize and close the solenoid valve 21 and to energize and open the solenoid valve 22.

If the target difference is within the tolerance, on the other hand, step 115 is executed thereby to deenergize and close all the solenoid valves.

Further, when the adjusting operation of the rear adjusting means is stopped, the control programs for the front adjusting means indicated in steps 116 to 119 are executed in the same way as described above.

This control program is repeatedly executed, with a result that the respective adjusting means are maintained so that the actual positions thereof stay within the tolerable range of the respective target adjustment positions. In this way, in the case where an ascending slope is detected, for instance, the rear part of the vehicle body is maintained slightly higher than the front part thereof, and therefore the driver's position is maintained in a satisfactory state.

In the above-described embodiment, upon detection of the lighting of the front light at step 108, the target rear adjustment position $A_R$ of the rear adjusting means may be set to the reference valve $A_0$ in the same manner as the front adjusting means.

The present invention may also be applicable to automotive vehicles provided with vehicle height adjusting means using a hydropneumatic suspension.

In the application of the present invention, the number of the vehicle height adjusting means and the arrangement thereof in relation to the wheels may be selected in the embodiment of the present invention.

Further, in the aforementioned construction of the embodiment, individual parts may be replaced by equivalent parts termed differently or the control program for the operating circuit may be partially altered as required.

It will thus be understood from the foregoing description that according to the present invention, the vehicle body is controlled so that the rear part thereof is slightly higher than the front part thereof when the vehicle runs up a slope, with the result that the driver does not suffer from any extra trouble but he is maintained in a satisfactory position, thus improving the riding feeling or performance by the stable vehicle height control.

We claim:

1. A vehicle height control system comprising:
vehicle height adjust means responsive to a control signal applied thereto for adjusting respective heights of at least a front end and a rear end of a vehicle;
position signal generator means for generating actual position signals indicative of the heights of at least the front and rear ends of the vehicle;
inclination detect means for generating an inclination signal related to an inclination of a road surface on which the vehicle is running;
lighting detect means for detecting a lighting state of headlamps of the vehicle to generate a lighting signal indicative thereof;
command means for generating a first command signal which allows said vehicle height adjust means to raise the height of the rear end by a first predetermined amount relative to the height of the front end when said inclination signal indicates that the inclination of the running surface is ascending, and for generating a second command signal which allows said vehicle height adjust means to raise the height of the rear end by a second predetermined amount smaller than said first predetermined amount relative to the height of the front end when the inclination of the running surface is ascending and said lighting signal is indicating lighted lamps; and
control means for applying said control signal to said vehicle height adjust means to allow said adjust means to adjust a height difference between the front end and the rear end by comparing one of said first and second command signals with said actual position signals.

2. A vehicle height control system according to claim 1 wherein said vehicle height adjust means has a plurality of systems corresponding to a plurality of wheels of the vehicle.

3. A vehicle height control system according to claim 2 wherein said plurality of systems includes first means for simultaneously adjusting right and left front wheels of the vehicle and second means for simultaneously adjusting right and left rear wheels of the vehicle.

4. A vehicle height control system according to claim 1 wherein said command means generates said first and second command signals each having a front target signal indicating a target value of the height of the front end and a rear target signal indicating a target value of the height of the rear end which is greater than that of the height of the front end.

5. A vehicle height control system according to claim 4 wherein said control means has first means for generating a first control signal for adjusting the height of the rear end to reduce the difference between said rear target signal and said actual position signal indicating an actual height of the rear end when the difference therebetween is greater than a predetermined range, and second means for generating a second control signal for adjusting the height of the front end so as to reduce the difference between said front target signal and said actual position signal indicating an actual height of the front part when the difference therebetween is greater than said predetermined range.

6. A vehicle height control system comprising:
vehicle height adjust means responsive to a control signal applied thereto for adjusting respective heights of at least a front part and a rear part of a vehicle;
position signal generator means for generating actual position signals indicating the heights of at least the front and rear parts of the vehicle;
inclination detect means for generating an inclination signal related to an inclination of a road on which the vehicle is running;
command means responsive to said inclination signal for generating a command signal for raising the height of the rear part relative to the height of the front part by a first predetermined amount when said command means determines that the inclination of the running surface is ascending;
control means for comparing said command signal with said actual position signals to supply said control signal to said vehicle height adjust means to allow said adjust means to adjust the difference between the height of the front part and the rear part;
lighting detect means for detecting a lighting state of head lamps of the vehicle and generating a lighting signal indicative thereof; and
correction means responsive to said lighting signal for correcting the difference between the heights of the front and rear parts to a second predetermined amount smaller than said first predetermined amount.

7. A vehicle height control system according to claim 6 wherein said command means generates said command signal having a front target signal indicating a target value of the height of the front part and a rear target signal indicating a target value of the height of the rear part which is greater than that of the front part.

8. A vehicle height control system according to claim 6 wherein said control means has first means for generating a first control signal for adjusting the height of the rear part as to reduce the difference between said rear target signal and said actual position signal indicating an actual height of the rear part when the difference therebetween is greater than a predetermined range, and second means for generating a second control signal for adjusting the height of the front part so as to reduce the difference between said front target signal and said actual position signal indicating an actual height of the front part when the difference therebtween is greater than said predetermined range.

9. A vehicle height control system comprising:

vehicle height adjust means responsive to a control signal applied thereto for adjusting respective heights of at least a front end and rear end of a vehicle body and having first means for adjusting the heights of right and left front wheels of the vehicle and a second means for adjusting the heights of right and left rear wheels of the vehicle;

position signal generator means for generating actual position signals indicating the height of at least the front and rear part of said vehicle;

inclination detect means for generating an inclination signal related to an inclination of a road surface on which the vehicle is running;

command means responsive to said inclination signal for generating a command signal having a front target signal indicating a target value of the height of the front part and a rear target signal indicating a target value of the height of the rear part greater than that of the height of the front part, when said command means decides that the inclination of the running surface is ascending; and control means for comparing said command signal with said actual position signals and for applying said command signal to said vehicle height adjust means to allow said adjust means to adjust the difference between the heights of the front and rear ends to a predetermined amount.

10. A vehicle height control system according to claim 9 wherein said command means is provided with switching means for changing the difference between the heights of the front and rear parts in a stepwise fashion to a plurality of values in accordance with running conditions related to vehicle height adjustment and for selecting the front target signal and the rear target signal corresponding to each value.

11. A vehicle height control system according to claim 10 further comprising lighting detect means for detecting a lighting state of head lamps of the vehicle as one of said running conditions to generate a lighting signal which is applied to said switching means as a switching signal.

* * * * *